Feb. 28, 1939.  J. D. LE FRANK  2,148,481
PRESS CLUTCH
Filed June 6, 1934  2 Sheets-Sheet 1

INVENTOR
John Daniel Le Frank
BY
ATTORNEYS

Feb. 28, 1939.   J. D. LE FRANK   2,148,481
PRESS CLUTCH
Filed June 6, 1934   2 Sheets-Sheet 2
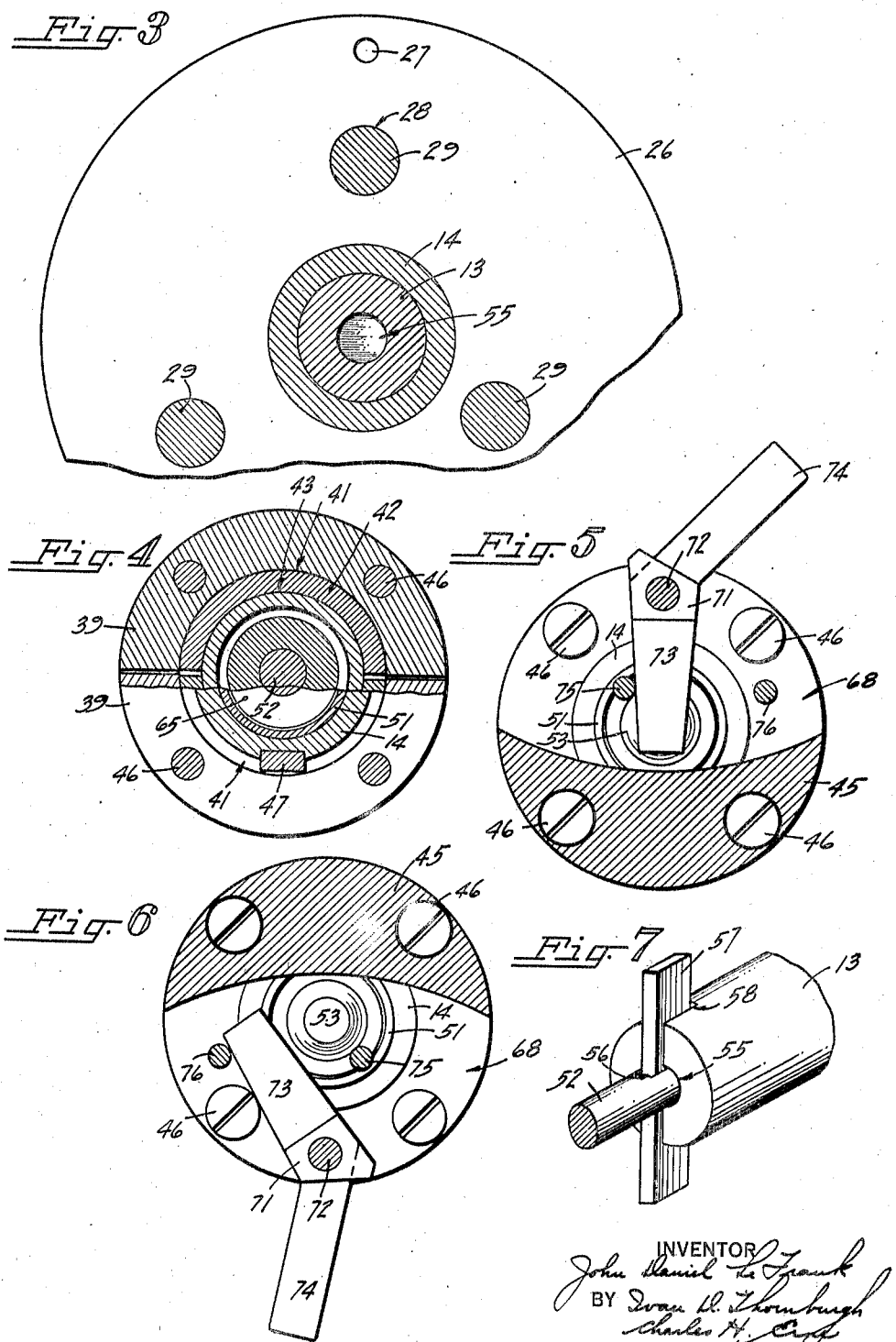

Patented Feb. 28, 1939

2,148,481

UNITED STATES PATENT OFFICE 2,148,481

PRESS CLUTCH

John Daniel Le Frank, Maplewood, N. J., assignor to American Can Company, New York, N. Y., a corporation of New Jersey Application June 6, 1934, Serial No. 729,323

11 Claims. (Cl. 192—56)

The present invention relates to a clutch mechanism for presses and the like and has more particular reference to the holding of the connecting clutch parts with different yielding pressures, the starting of the press operation with the relatively great inertia of the press load which must be overcome requiring a greater pressure than is required after the press parts are moving, the automatic selection of the proper yielding pressures which is provided for in the invention producing a sensitive self adjusting slip connection which is compatible with the clutch force required.

An object of the present invention is the provision of a clutch mechanism which includes a slip connection between the driving and the driven parts which is maintained by yielding forces, one set of forces applying when the operating parts of the press are first moved and another set holding the clutch connection after the press is operating.

Another object of the invention is the provision of clutching instrumentalities for a press clutch which are in part actuated by a starting holding force automatically held dormant but maintained in an operable position as long as the press is not under operation, this force becoming active during starting of the press and being automatically nullified and inoperative after the press parts have been brought under operating movement.

A further object of the invention is the provision of a latch device in a press clutch of the character described which is cooperatively associated with a relatively strong yielding pressure force for holding the clutch parts in clutching position to permit starting of the press with its attendant load and to overcome the inertia of the load, this latch being automatically thrown out of cooperative position to nullify the stronger yielding force after the press has been started.

Yet another object of the invention is the provision of a slip clutch mechanism in which driving and driven members are yieldingly held connected for operation of the press, the holding of this connection being just sufficient to permit operation of the press after the parts have begun their movement and thus providing a sensitive slip clutch to permit disconnection of the driving and driven members upon the establishment of abnormal conditions, together with other holding yielding devices which are brought into play only when the press is first started and the inertia of its stationary load first overcome.

A further object of the invention is the provision of yielding holding devices of a slip clutch of the character described wherein a greater yielding holding force is effective only when a latch device is in a certain position, this latch device being thrown out by centrifugal force as soon as the operating parts of the clutch begin their movement so that the greater holding force associated with the latch is nullified and the holding devices are then yieldingly held under a lesser holding force.

Numerous other objects and advantages of the invention will be apparent as it is better understood from the following description, which, taken in connection with the accompanying drawings, discloses a preferred embodiment thereof.

Referring to the drawings:

Fig. 3 is a transverse sectional view partly broken away taken substantially along the line 3—3 in Fig. 1;

Figure 1:
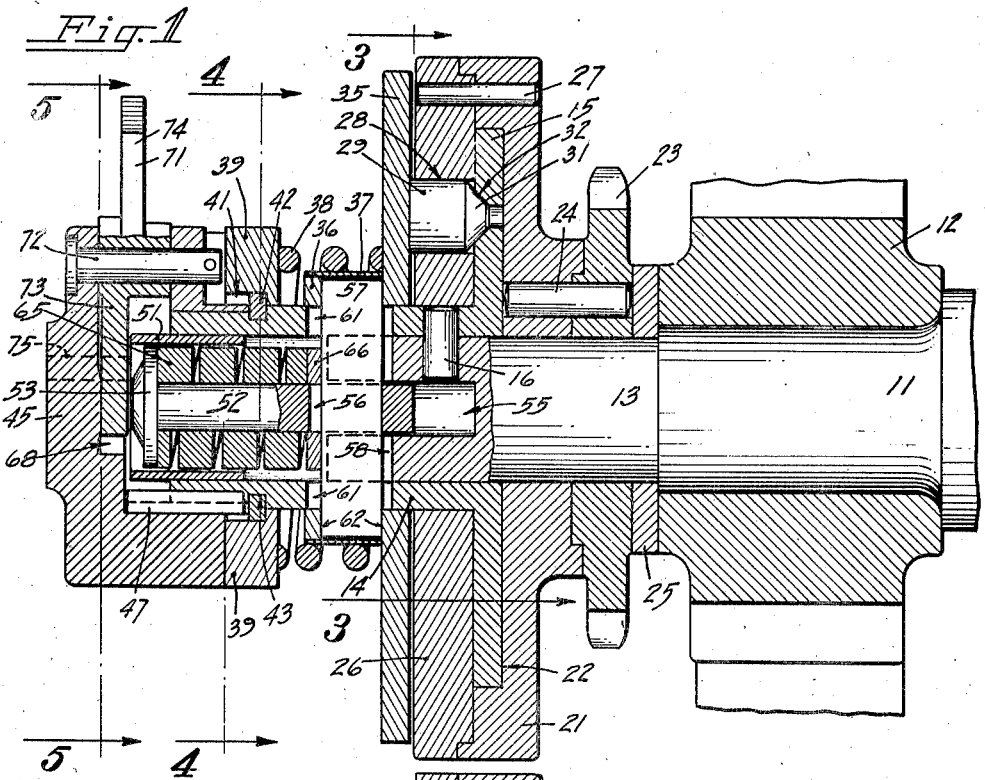
Figures 1 and 2 are longitudinal sectional views partly in elevation of associated clutch parts embodying the present invention, Fig. 1 showing the clutch connected for driving and Fig. 2 showing the clutch thrown out of driving connection.
Figure 2:
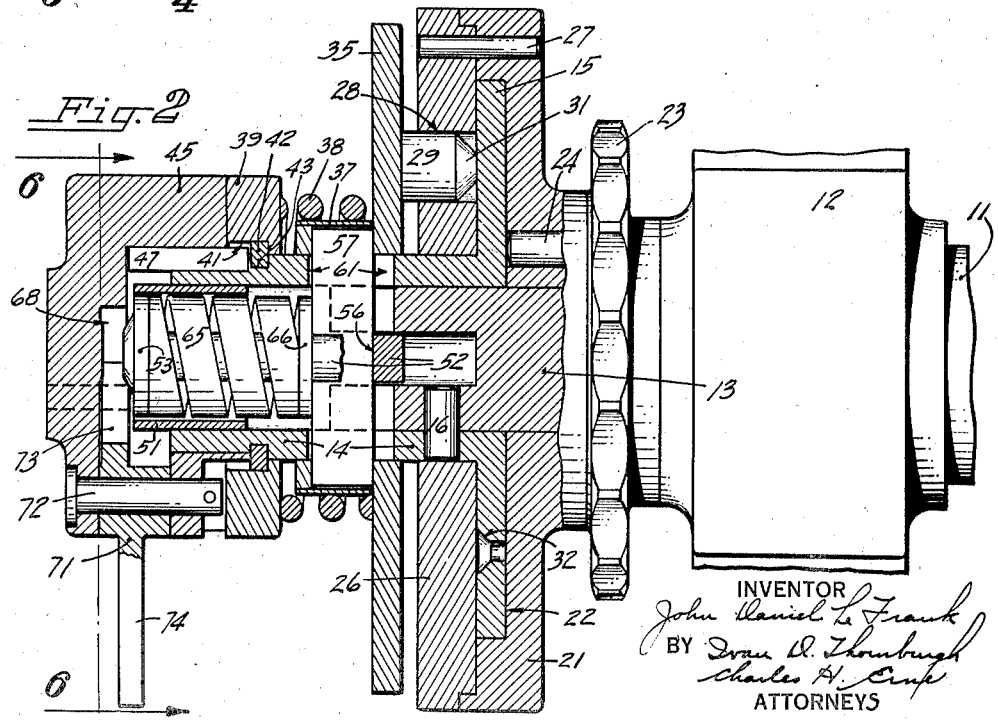

Figs. 4 and 5 are transverse sectional details of a part of the clutch mechanism being taken substantially along the lines 4—4 and 5—5 in Fig. 1 and showing different positions of the parts;

Fig. 6 is a similar transverse sectional view taken substantially along the line 6—6 in Fig. 2; and Fig. 7 is a perspective view of a part of the driven shaft of a press or other apparatus and showing its connection with a clutch locking key.

A preferred embodiment of the present invention as illustrated in the drawings comprises a driven shaft 11 (Figs. 1 and 2) which may be journaled in a bearing 12. This shaft may constitute the principal driven shaft of a press or other suitable apparatus and is used in this description to indicate any working parts of such an apparatus which are set in motion through the intermediary of the clutch.

Shaft 11 is reduced at its end in an extension 13 which carries a sleeve hub 14 of a disc 15, the hub being secured to the end of the shaft extension by a pin 16 so that disc and shaft move together. The hub 14 extends beyond the end of the shaft. The disc 15 constitutes the driven part of the clutch mechanism.

A clutch body 21 is loosely mounted on the reduced end 13 of the shaft 11 and one face is countersunk at 22 to accommodate the disc 15.

Body 21 is connected with a sprocket 23 by a pin 24 the sprocket being also mounted on the end of the shaft. The clutch body and sprocket constitute driving parts of the clutch mechanism and driving power may be applied to the sprocket in any suitable manner.

It should be understood that in starting the press or other apparatus, the driving member of the clutch is first rotated by power applied to its sprocket 23 and through the clutch mechanism this rotation is imparted to the shaft 11 and other parts of the press associated therewith. Furthermore, such rotation of the sprocket is usually continued for one complete turn which constitutes one operating cycle.

A washer 25 is preferably mounted on the shaft section 13 to serve as a thrust bearing for the sprocket 23, this washer being located adjacent the bearing 12 of the shaft 11. The hub of the driven disc 15 carries a ring 26 which is secured to the face of the clutch body 21 by pins 27. One face of this ring is adjacent to the disc 15 and holds the latter within its seat 22, the ring with its clutch body being free to move relative to the disc except for connecting clutch instrumentalities which will now be described.

The ring 26 (Figs. 1 and 3) is cut through in spaced horizontally disposed openings 28 in which clutch pins 29 are located. There are three openings and three clutch pins illustrated in the drawings but the exact number is immaterial.

Each clutch pin 29 is formed with a conical inner face 31 which is adapted to seat within a conical countersink 32 formed in the adjacent face of the disc 15 when the clutch is in its clutched or connected position.

The clutch pins are held under yielding pressures being backed up by a sliding disc 35 having a hub 36 which is loosely mounted on the hub 14 of the disc 15. A collar band 37 is mounted on the outside of the hub 36 and supports encircling coils of a spring 38 one end of which engages the outer face of the disc 35.

The opposite end of spring 38 is held against a pair of ring segments 39 (Figs. 1 and 4) which are also mounted on the end of the hub 14 of the disc 15. The ring segments are counterbored at 41 and segmental keys 42 are interposed between the ring segments and the hub 14 and are held in a groove 43 cut in the hub. These keys provide stops for the ring segments 39, this construction holding the spring 38 under a predetermined compression so that it exerts a given pressure against the outer ends of the clutch pins normally holding the latter in their seats 32 in the disc 15. A collar housing 45 is also carried on the end of the disc hub 14. This collar is secured to the ring segments 39 by bolts 46 (Figs. 4 and 5) and is prevented from turning on the disc hub 14 by a key 47.

Spring 38 is the light pressure spring which is used to hold the clutch pins in clutched position while the press is rotating. By maintaining this spring relatively light in its action the clutch is made sufficiently sensitive to throw out when abnormal conditions place an undue strain upon the rotating driven shaft 11. It is sufficient, however, in its holding action to maintain the clutched position of the clutch pins during the normal operation of the press shaft 11.

An abnormal condition set up while the press is operating throws an excessive strain upon the shaft and this, if the strain is sufficient, holds the disc 15 against rotation. Thereupon the driving members including the clutch ring 26 move relative to the disc 15 and the inclined ends 31 of the clutch pins 29 ride out of their seats 32 as the spring 38 yields and the disc 35 moves back into the unclutched position of Fig. 2. The relatively heavy driven mechanism of the press thereupon ceases operation, augmented by the abnormal load or strain imposed upon the shaft 11 to bring about the described disengagement of the clutch, and the tension of the light pressure spring 38 is insufficient to thereafter force the tapered clutch pins 29 into successive registering countersinks 32 in the driven disk 15 with sufficient pressure to again reestablish the driving engagement. Therefore the said pins merely ride in and out of the countersunk bores 32 until the abnormal strain or load has been relieved or corrected.

The operation of the clutch just considered relates to the slipping action incident to the press parts in motion. Consideration will now be given to that other stronger or greater resisting clutch holding feature which has only been suggested heretofore and which relates to the starting of the driving and driven members from a dead stop.

A sleeve 51 (Figs. 1, 2 and 4) is inserted in the outer end of the disc hub 14 and projects beyond the end of the hub being also located on the inside of the collar 45 and partially encloses the heavy spring unit now being considered. This unit comprises a pin 52 which is formed with a head 53 the head being adjacent the outer wall of the collar 45. The opposite end of the pin 52 protrudes into the open end of a bore 55 which is formed in the end of the reduced section 13 of the shaft 11. Pin 52 is slotted at 56 and an elongated key 57 (see also Fig. 7) is confined within the slot.

The key 57 extends out from both sides of the pin being loosely confined within a slot 58 cut in the end of the shaft section 13. The key 57 passes through aligned slots 61 cut in the hub 14 of the disc 15. The ends of the key 57 beyond the disc hub 14 extend into aligned slots 62 cut in the hub 36 of the sliding disc 35. The key is held against longitudinal movement and within the various slots by the collar band 37.

A heavy spring 65 is mounted on the pin 52 and is confined between the head 53 of the pin and a washer 66 mounted on the pin and engaging one side of the key 57. This spring is fully located inside of the sleeve 51 and the disc hub 14 and is passive or ineffective as long as the key 57 is held in the pin end of the pin slot 56, i. e., to the right of the slot as in both Figs. 1 and 2. As long as the spring 38 is sufficient in strength to hold the clutch pins in their clutched position (Fig. 1) the spring 65 is passive, this being the setting of the parts just prior to starting the machine.

Provision is made for inserting a latch element between the end wall of the collar 45 and the head 53 of the pin 52. The collar 45 is cut away from one side to form a space 68 adjacent its outer wall (see Figs. 5 and 6). A latch 71 is pivotally mounted on a pin 72 which is carried in the collar 45 and this pin extends across the cut out space.

Latch 71 is formed with an inner arm 73 and an outer arm 74 the former being located in the space 68. When the press comes to a stop after each operation the collar 45 is brought into the position illustrated in Figs. 1 and 5 with the space 68 on top. The outer arm 74 of the latch under the action of gravity thereupon brings its inner arm 73 into vertical position where it engages a stop pin 75 inserted through the end wall of the collar 45 and projecting into the space 68. In this position the end of the arm 73 is adjacent the head 53 of the pin 52 and these parts remain so until the press begins movement.

In beginning the operation of the press or other mechanism by rotating the sprocket 23 the overcoming of the inertia of its load, which must be picked up through the clutch, tends to cause the clutch pins 29 to ride out of their seats, the spring 38 being too weak to prevent this. The disc 35 does start moving (toward the left Fig. 1) sufficiently to shift the heavy spring unit by movement of the key 57. The head 53 of the pin 52 immediately comes into engagement with the arm 73 of the latch 71 and the spring 65 thereupon is placed into an effective condition.

Any further movement of the sliding disc 35 must now overcome the resistance of the heavy spring. This resistance is predetermined so that it is just sufficient to prevent the disc 35 from moving far enough to disengage the clutch pins 29 if there is a normal starting load on the press shaft 11. With a normal load, accordingly, the pins are held in clutched position until the driven shaft 11 and parts connected therewith are picked up and rotated in unison with the drive sprocket 23.

As soon as these parts begin rotating the inertia of the load is relieved and thereafter the spring 38 is sufficient to hold the clutch in clutched position and the heavy spring unit is shifted back in the position of Fig. 1 and the head 53 of the pin 52 moves away from the arm 73 of the latch 71.

The centrifugal forces which by this time have been set up by the rotating shaft and connected parts apply directly to the latch arm 74 and cause a pivoting of the latch 71 into the position shown in Fig. 6 where the arm 73 engages against a stop pin 76 which like the pin 75 is similarly carried in the collar 45. In this latter position the arm 73 is clear of the head 53 of the pin 52 and throughout the remaining portion of the cycle of operation, or as long as there is rotative movement of the press shaft, the spring 38 is effective in holding the parts in clutched position.

In the event that there is an abnormal starting load or an excess blocking of the shaft 11 as the driving power is applied to the sprocket 23, the rotating ring 26 sweeps the clutch pins 29 out of their seats within the disc 15 as the heavy spring 65 yields. This prevents damage to the machine in starting.

It will thus be observed that during the starting of the press the heavy spring unit is effective so that as long as there is the normal load of the apparatus to be picked up with the starting of the driving member parts the driving and driven members will be maintained in clutched position. In the event, however, that an abnormal condition obtains at such a time the heavy spring unit yields sufficiently to prevent damage to the machine.

As soon as the apparatus begins its movement the heavy spring unit is thrown out of action and its effect is completely nullified and thereupon the lighter spring unit of the clutch retains the driving and driven members in clutched relation as long as normal operating conditions obtain. In the event of an abnormal condition the light spring unit is sufficiently sensitive to prevent any damage to the apparatus and at such time the connecting parts will become unclutched.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a clutch mechanism for a press, the combination of a driving member, a driven member, clutch instrumentalities for connecting the driving and the driven members, a plurality of yielding means for exerting different pressures on said instrumentalities in accordance with the load on said driven member to hold the said driving and driven members connected, and means movable in a plane transverse to the axis of said members for nullifying the greater of said holding means after the press is operating.

2. In a clutch mechanism for a press, the combination of a driving member, a driven member, clutch instrumentalities for connecting the driving and the driven members, a pair of yielding means for exerting different pressures on said instrumentalities in accordance with the load on said driven member to hold the said driving and driven members connected, means for utilizing both pressures in starting operation of the press from a dead stop, and means movable centrifugally in a plane transverse to the longitudinal axis of said members for nullifying the greater of said holding means after the press is operating.

3. In a clutch mechanism for a press, the combination of a driving member, a driven member, clutch instrumentalities for connecting the driving and the driven members, yielding means for holding said instrumentalities in connected position with a predetermined pressure during operation of the press, and a second yielding means controlled by said first mentioned means when the driving member first begins its movement for holding said instrumentalities in connecting position with a greater pressure to overcome the starting inertia of the load on the press, said second yielding means being bodily movable relative to one of said members and said first mentioned yielding means to release the holding pressure of said second yielding means after the starting inertia of the press load has been overcome.

4. In a clutch mechanism for a press, the combination of a driving member, a driven member, clutch instrumentalities for connecting the driving and the driven members, yielding means for holding said instrumentalities in connected position with a predetermined pressure during operation of the press, and a second yielding means set into effective action by the yielding of said first mentioned yielding means when the driving member begins its movement and for holding said instrumentalities in connecting position with a pressure in excess of the pressure of said first mentioned yielding means to overcome the starting inertia of the load on the press, said second yielding means being bodily movable relative to one of said members and said first mentioned yielding means to release the holding pressure of said second yielding means after the starting inertia of the press load has been overcome.

5. In a clutch mechanism for a press, the combination of a driving member, a driven member, clutch instrumentalities including cooperating fixed and sliding discs for connecting the driving and the driven members, yielding means including a spring operative with said sliding disc for holding said instrumentalities in connecting position with a predetermined pressure during operation of the press, a second yielding means including a sliding spring unit having a heavier spring than the spring of said first yielding means, and a pivoted latch member cooperating with said second yielding means when the press is started from a stop position to prevent sliding of said heavy spring unit and through its spring to prevent sliding of said sliding disc in order to overcome the starting inertia of the load on the press.

6. In a clutch mechanism for a press, the combination of a driving member, a driven member, clutch instrumentalities for connecting said driving and driven members, and a plurality of spring members for exerting different pressures on said instrumentalities in accordance with the load on said driven member to hold the said driving and driven members connected, one of said spring members being axially slidable relative to said driven member after exerting its respective pressure.

7. In a clutch mechanism for a press, the combination of a driving member, a driven member, clutching instrumentalities for connecting the said driving and driven members, and a plurality of spring members for exerting pressure on said instrumentalities to hold them in connecting position, said holding pressure being controlled in part by a said spring member which is bodily and axially movable relative to said driven member after exerting its respective pressure to start operation of the press.

8. In a clutch mechanism for a press, the combination of a driving member, a driven member, clutching instrumentalities for connecting the said driving and driven members, a plurality of spring elements for exerting pressure on said instrumentalities to hold them in connecting position, said holding pressure being greater at the starting of operation of the press, and means engaged by only one of said spring elements and slidably operative relative to said members each time the press is stopped to condition the said greater holding pressure for effective use when required for starting.

9. In a clutch mechanism, the combination of a driving member, a driven member, clutch instrumentalities for connecting said driving and driven members, a pair of independent concentrically disposed spring members for exerting light and heavy pressures on said instrumentalities, and means slidable axially relative to said members and engaging one only of said yielding means for selectively utilizing said pressures, whereby the said light pressure is effective on said instrumentalities after the starting load has been picked up under said heavy pressure.

10. In a clutch mechanism, the combination of a driving member, a driven member, clutch instrumentalities for connecting the driving and driven members for a combined rotative movement, said instrumentalities including a sliding clutch pin carried by one of said members and engageable with the other, yielding means for holding said clutch pin in clutched position, and a latch device pivotally mounted for movement in a plane parallel to the plane defined by the rotative movement of said members for preventing yielding action of said yielding means in starting rotary movement of the clutch from a dead stop, said latch device being automatically movable by centrifugal action after normal rotary speed has been obtained to nullify its preventing action on said yielding means.

11. In a clutch mechanism for a press, the combination of a driving member, a driven member, clutch instrumentalities for connecting the driving and driven members for unitary rotary movement, said instrumentalities including an axially movable clutch pin carried by one of said members for yieldable engagement with the other of said members, spring tension means for yieldingly holding said clutch pin in clutched position, and a pivotally mounted latch member movable in a plane coinciding with the path of rotary movement of said driving and driven members for preventing yielding action of said yielding means in starting operation of the press from a dead stop, said latch member being automatically movable by centrifugal action in a plane transverse to the longitudinal axis of said members after the press is operating to permit yielding action by said yielding means.

JOHN DANIEL LE FRANK.